No. 733,052. PATENTED JULY 7, 1903.
J. KNOWLES.
ROTARY ENGINE.
APPLICATION FILED SEPT. 23, 1902.
NO MODEL. 5 SHEETS—SHEET 1.
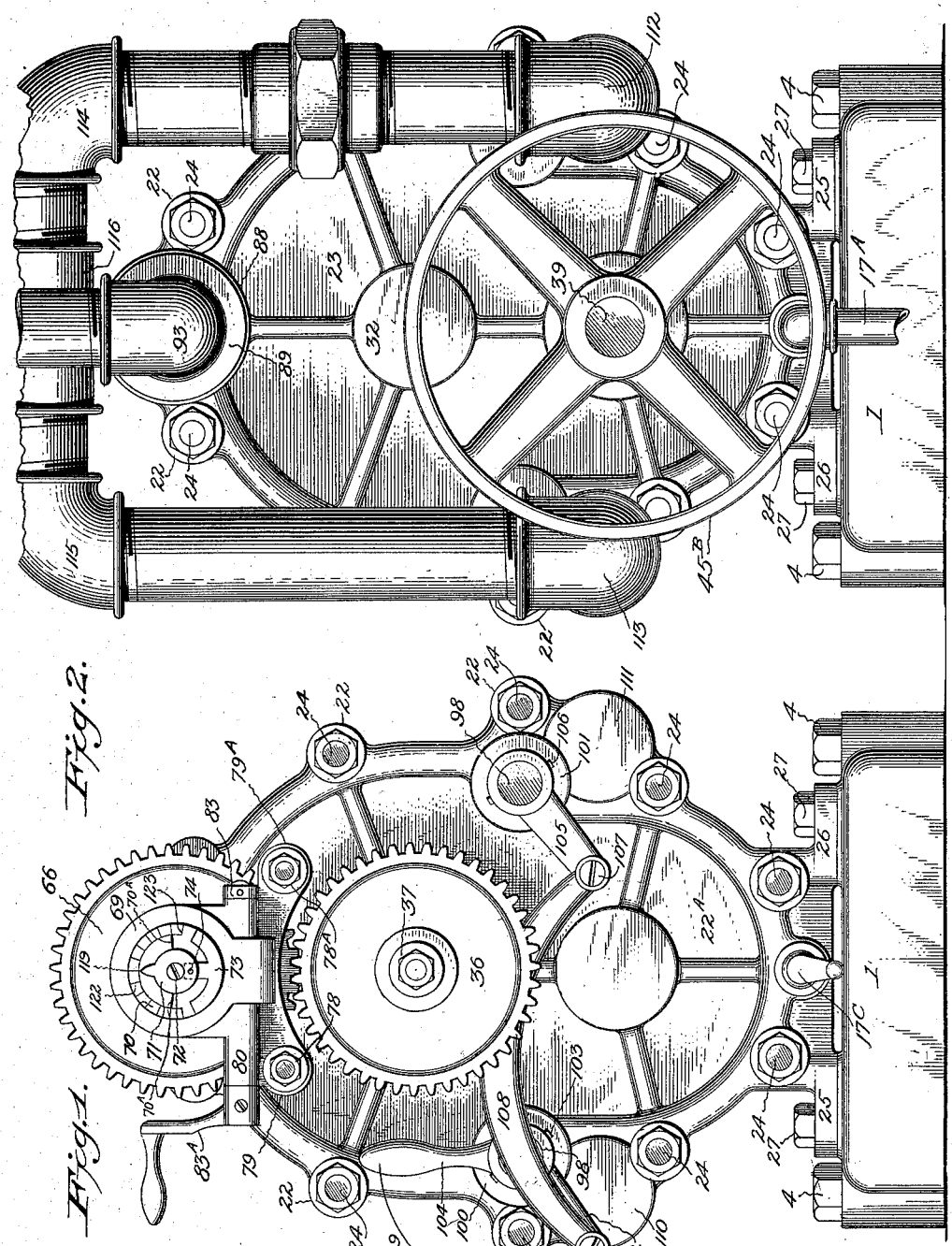

No. 733,052. PATENTED JULY 7, 1903.
J. KNOWLES.
ROTARY ENGINE.
APPLICATION FILED SEPT. 23, 1902.
NO MODEL. 5 SHEETS—SHEET 2.
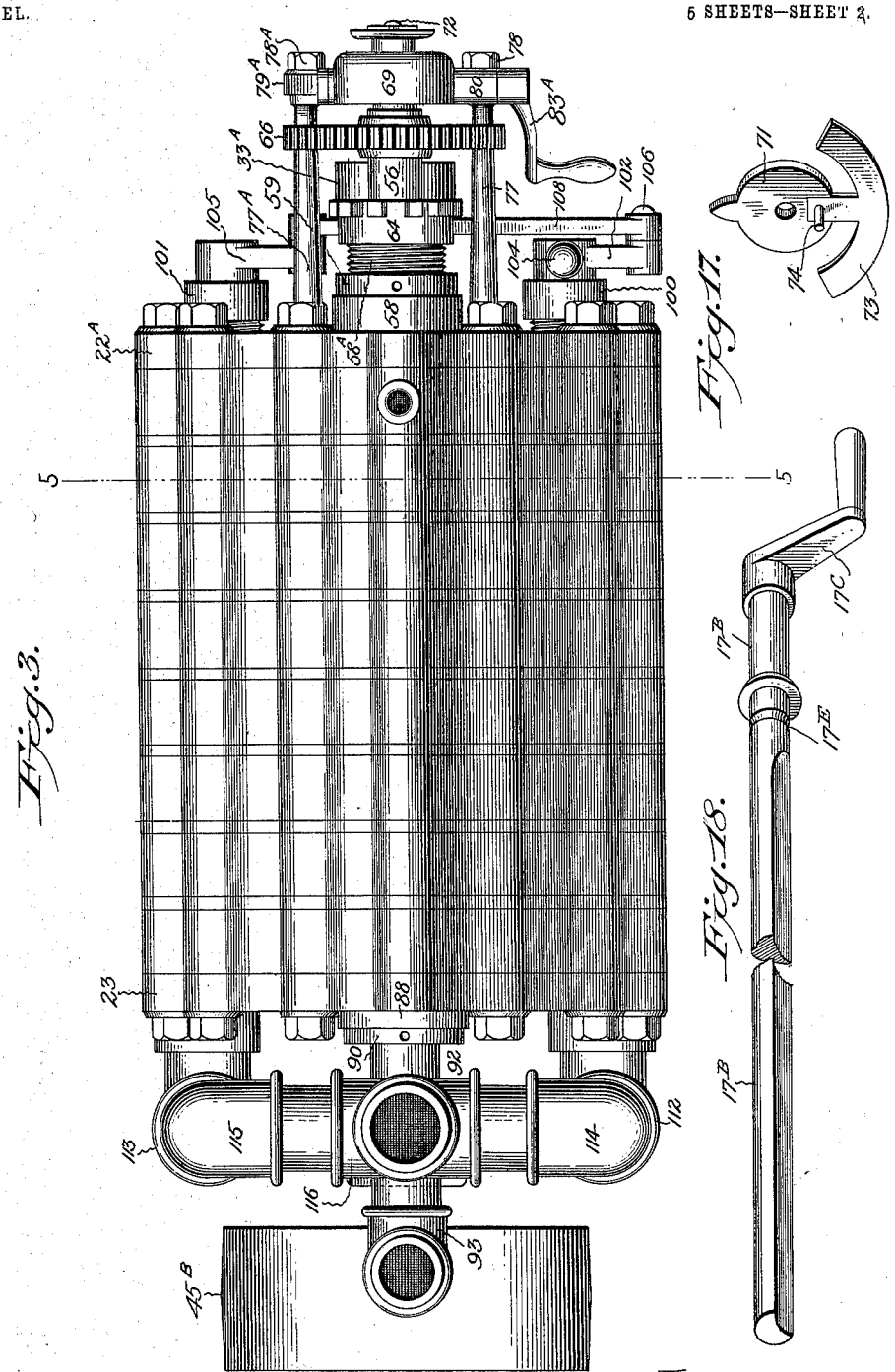

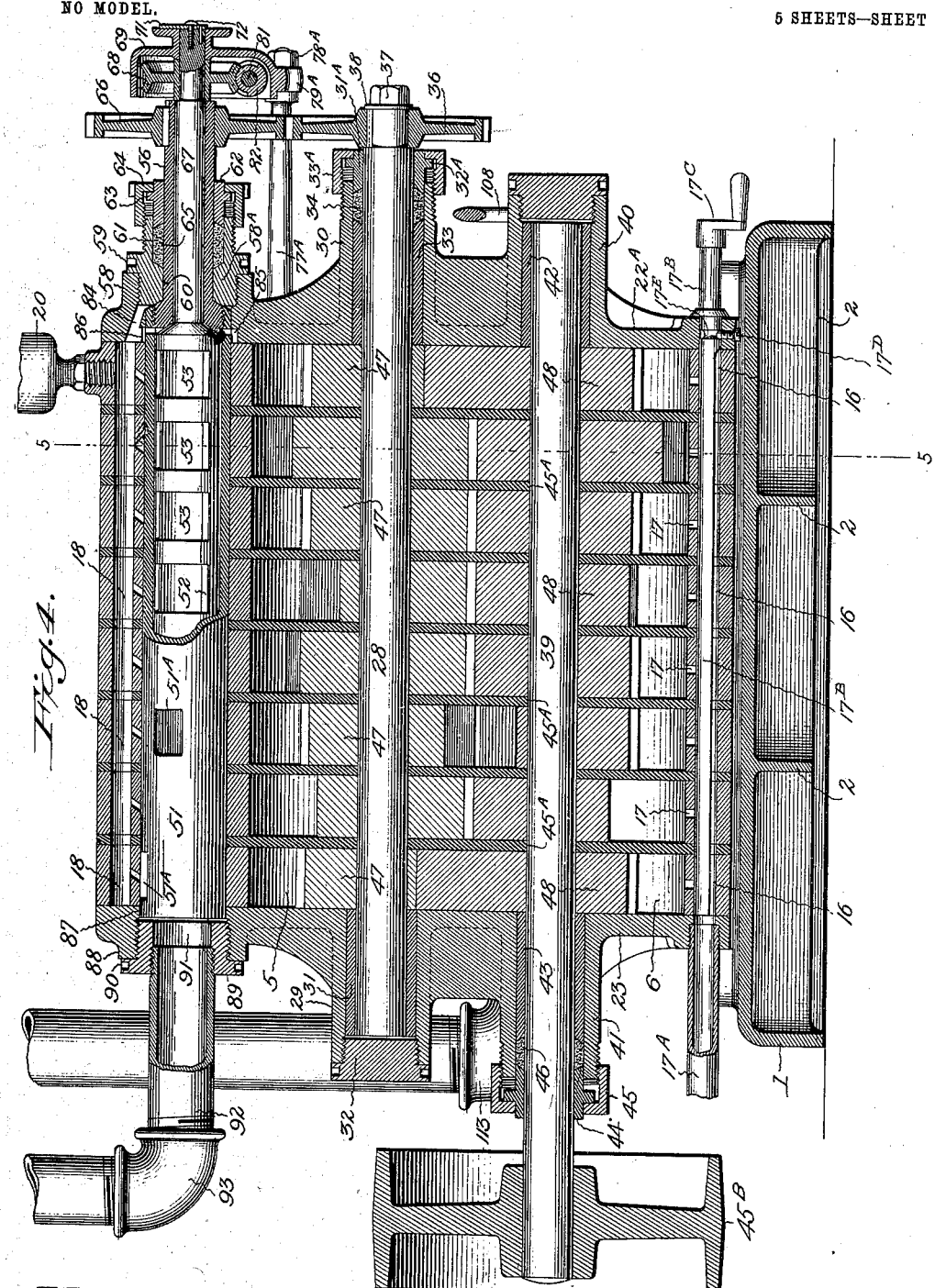

No. 733,052. PATENTED JULY 7, 1903.
J. KNOWLES.
ROTARY ENGINE.
APPLICATION FILED SEPT. 23, 1902.
NO MODEL. 5 SHEETS—SHEET 4.
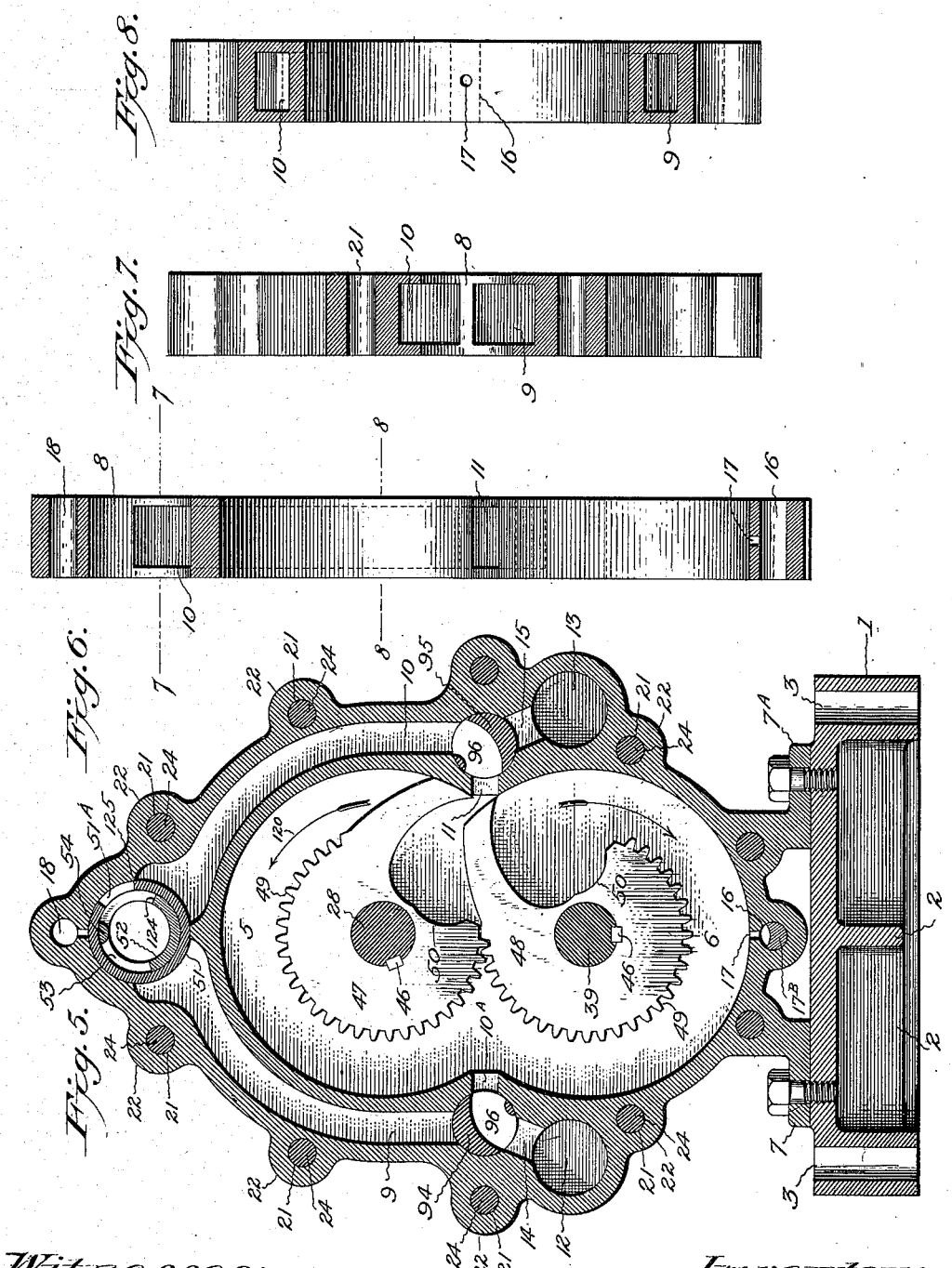

No. 733,052. PATENTED JULY 7, 1903.
J. KNOWLES.
ROTARY ENGINE.
APPLICATION FILED SEPT. 23, 1902.
NO MODEL. 5 SHEETS—SHEET 5.
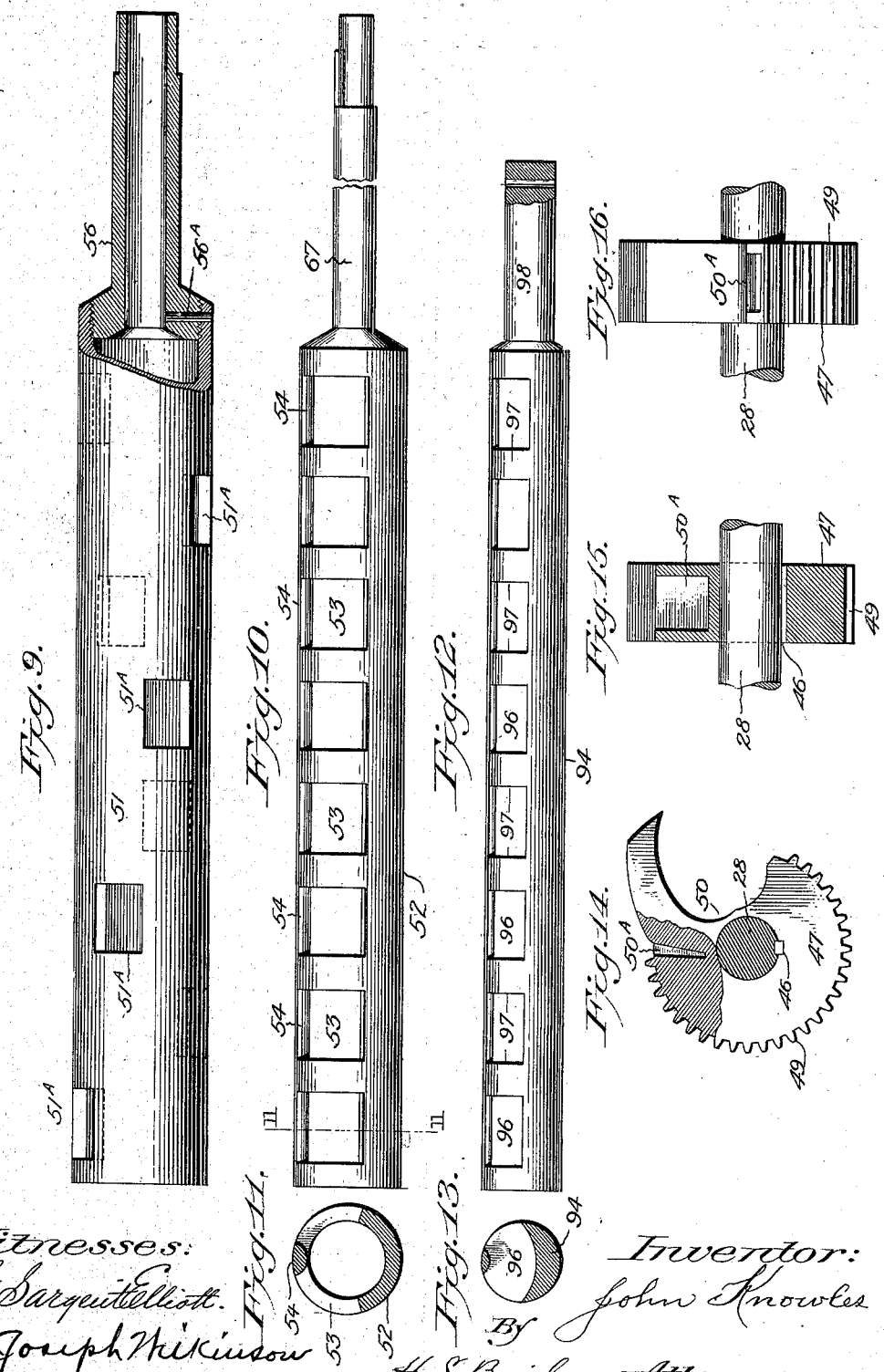
Witnesses:
G. Sargent Elliott.
Joseph Wilkinson
Inventor:
John Knowles
By H. S. Bailey, Attorney.

No. 733,052.

Patented July 7, 1903.

UNITED STATES PATENT OFFICE.

JOHN KNOWLES, OF COLORADO SPRINGS, COLORADO.

ROTARY ENGINE.

SPECIFICATION forming part of Letters Patent No. 733,052, dated July 7, 1903.

Application filed September 23, 1902. Serial No. 124,562. (No model.)

*To all whom it may concern:*

Be it known that I, JOHN KNOWLES, a citizen of the United States of America, residing at Colorado Springs, in the county of El Paso and State of Colorado, have invented certain new and useful Improvements in Rotary Engines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in rotary engines; and the objects of my invention are, first, to provide a rotary steam-engine adapted for all purposes where power is required, and especially adapted for automobiles, yachts, launches, and other motor-using devices; second, to provide a rotary engine comprising a plurality of coöperating cylinders and pistons provided with a variable cut-off valve arranged to cut off and use the steam expansively at several predetermined ports of the operative travel of the rotary pistons; third, to provide a rotary engine having a valve-cut-off index, by which the steam may be cut off at any desired part of the stroke or operative travel of the rotary pistons; fourth, to provide a rotary engine having a plurality of cylinders and a valve mechanism arranged to permit a quarter or a half or three-quarters or the whole mechanical horse-power of the engine to be used at the will of the operator by manipulation of the valves and using the steam expansively, while at the same time using all of the cylinders coöperatively in either case; fifth, to provide a compact, light, simple, and very highly efficient power-producing and economical steam-using rotary steam-engine. I attain these objects by the mechanism illustrated in the accompanying drawings, in which—

Figure 1 represents an end elevation of what I term the "front end" of my improved rotary engine. Fig. 2 is an end elevation of what I term the "rear end" of the engine. Fig. 3 is a plan view of the engine. Fig. 4 is a longitudinal vertical section of Figs. 1, 2, and 3. Fig. 5 is a cross-section through one of the cylinders on line 5 5 of Figs. 3 and 4. Fig. 6 is a vertical section of one of the cylinders. Fig. 7 is a plan view of Fig. 6, showing the top end in section on line 7 7 of Fig. 6. Fig. 8 is a sectional plan view of Fig. 6 on line 8 8. Fig. 9 is a side elevation, partially in section, of the revoluble cut-off valve. Fig. 10 is a side elevation of the adjustable cut-off valve. Fig. 11 is a sectional end elevation on line 11 11 of Fig. 10. Fig. 12 is a side elevation of one of the steam-inlet valves. Fig. 13 is a section end elevation on line 13 13 of Fig. 12. Fig. 14 is a side view of one of the pistons and a section of the piston's shaft, the piston being shown partially in section, showing a recess formed in the periphery of the disk adjacent to the actuating-arm of the piston. Fig. 15 is a sectional elevation of one of the pistons, showing a fragment of the piston's shaft keyed therein. Fig. 16 is a plan view of Fig. 14. Fig. 17 is an elevation of the index model of the cut-off valve, and Fig. 18 is a perspective view of the condensed-steam-outlet valve.

Similar figures of reference refer to similar parts throughout the several views.

Referring to the drawings, the numeral 1 designates the base-plate. This plate is preferably a hollow casting suitably strengthened by ribs 2 to withstand the weight of the cylinders above. Anchor-bolt holes 3 are provided at the sides of the base, and anchor-bolts 4 are used to bolt and secure the base-plate to a foundation. Upon the base-plate I bolt the engine. The engine for any horse-power comprises a plurality of coöperating cylinders arranged side by side with a removable divisional plate or supplementary cylinder-heads between each pair of cylinders, the cylinders and the divisional plates being bolted together between two cylinder-heads. The number of cylinders employed depends on the requirements and also the capacity or horse-power of the engine; but I preferably never use less than two cylinders and may use any number, as four, six, eight, ten, twelve, or more, as conditions and requirements may suggest. In the accompanying drawings I show eight cylinders and their divisional plates bolted together between two cylinder-heads into an engine. The drawings all are one-half size of engines I shall build, an engine of this size being suitable for all purposes where about from five to eight horse power is required. This size has also been especially designed for driving automobiles. Each cylinder comprises two coöperating piston chambers or cylinders 5 and 6. These are arranged in a vertical plane one above the other in vertical alinement. These piston-chambers are placed so close together that they intersect each other, and thus form one oblong chamber with circular ends. Each cylinder is a thin ring-shaped member, as shown in Figs. 6, 7, and 8. It is provided with feet-lugs 7 and $7^A$ on its lower end, which project from its opposite sides and rest on and are bolted to the base by suitable bolts. At the top of each cylinder a circular valve-port 8 is formed which extends through each cylinder. Steam-passages 9 and 10 are formed in the shell. These passages intersect and extend from this valve-port to the diametrical center line between the piston-chambers, where they enter into the piston-chambers diametrically opposite one another. Steam-inlet ports $10^A$ and 11 are formed in each steam-passage at the diametrical center line between the piston-chambers. Exhaust-passages 12 and 13 are formed in the shell of each cylinder axially with the piston-chamber and below the steam-inlet valve-ports. These exhaust-passages are connected to the steam-ports by exhaust-ports 14 and 15. At the bottom of each cylinder a condensed-steam passage 16 is formed through the shell of each cylinder parallel with the axis of the two piston-chambers, and a hole 17 is formed through the shell of each cylinder from the bore of the piston-chamber into the condensed-steam passage. This passage is continued through the rear cylinder-head, and a waste-pipe $17^A$ is threaded to it to convey the water of condensation away from the engine. The holes 17, leading into the condensed-steam passage, are normally closed by a stem $17^B$, which extends through the passage from one end of the engine to the other. The under side of the stem is grooved longitudinally, and when the stem is turned to a reverse position the groove will lie beneath the holes 17 and permit the water of condensation to pass out. The stem extends beyond the front head of the engine and is provided with a crank $17^C$ for reversing the same and is prevented from being withdrawn by a screw $17^D$, which passes through the lower edge of the front cylinder-head and enters a groove $17^E$ in the stem, as shown in Fig. 4. Above the cut-off-valve port I form an oil-passage 18, which extends axially through the shell of each cylinder at the same point, so that when the cylinders are bolted together the oil-holes of each cylinder will be in perfect alinement and will register with one another and form a continuous oil-passage through the cylinders. From the oil-passage of each cylinder an oil-hole is formed radially into the cut-off-valve port of each cylinder, so that oil may flow to and lubricate the revolving valves therein. In one of the cylinders an oil-inlet hole 19 is formed that leads into the oil-hole. This oil-inlet is preferably threaded and provided with an oil-cup 20. The shell of each cylinder is provided at substantially equal distances apart with bolt-holes 21. These bolt-holes are preferably placed in projecting lugs 22, which are preferably formed on the outside of the shell.

In Figs. 3 and 4 eight cylinders and seven supplementary cylinder-heads are shown. A cylinder-head $22^A$, which I preferably term the "front" cylinder-head, is placed at one end of this group of cylinders, and a cylinder-head 23, which I term the "rear" cylinder-head, is also placed at the opposite end of the cylinders. The cut-off-valve port, also the steam-inlet ports, the steam-exhaust ports, the condensed-steam passage, the oil-passage, and the bolt-holes of each cylinder, extends through the supplementary cylinder-heads, and all of these holes and passages are arranged and formed to register in axial alinement with one another. The piston-chambers of the cylinders, while they are separated from one another by the supplementary cylinder-heads, are also bored out to the same diameter and are arranged in exact axial alinement with one another. The cylinders, the supplementary cylinder-head, and the rear and front cylinder-heads are all bolted very tightly together by bolts 24, which pass through the bolt-holes 21 of these members. Both the front and rear cylinder-heads are provided with feet-lugs 25 and 26, respectively, which are securely bolted by bolts 27 to the base-plate 1. A piston-shaft 28 extends axially through the center of the piston-chamber 5 of each cylinder and also through the supplementary cylinder-heads and extends into a stuffing-box 29, formed in the rear cylinder-head, and into and through a stuffing-box 30, formed in the front cylinder-head. These stuffing-boxes 29 and 30 comprise projecting hub portions. A bushing 31 is fitted in the stuffing-box 29, and the adjacent end of the piston rests rotatively in it and a removable plug-cap 32 is threadedly secured in the end of the stuffing-box. A bushing 33 is secured in the inner end of the stuffing-box 30, and a gland $31^A$ is arranged to extend loosely into the outer end of the stuffing-box. The outer end of the gland is provided with a flange $32^A$, and a cap $33^A$ is threaded to the outer end of the stuffing-box and is arranged to fit down over the flange of the gland. The intermediate space between the inner ends of the bushing and the gland is filled with a suitable packing 34, which by screwing the cap onto the end of the stuffing-box is compressed around the piston-rod by the gland. The inner ends of the gland and bushing are beveled to force the packing against the piston-rod. The end of the piston-shaft that projects beyond the end of the stuffing-box is reduced in diameter, and a gear-wheel 36 is keyed to it. The extreme end of the shaft extends beyond the gear-wheel and is threaded, and a nut 37 is threadedly secured thereto. A washer 38 is mounted on the shaft between the nut and the gear-wheel. The nut clamps the gear-wheel against the shoulder formed by the reduced portion upon which it is mounted and secures it against accidental displacement therefrom. A piston-shaft 39 is also mounted in stuffing-boxes 40 and 41 in the front and rear cylinder-heads, respectively. These stuffing-boxes are exact duplicates of the stuffing-boxes 29 and 30. They are, however, arranged in reverse order, the packing stuffing-box 41 being on the rear cylinder-head instead of on the front cylinder-head, where the packing stuffing-box 30 is, and the bearing-box 40 is on the front cylinder-head instead of on the rear cylinder-head, where the bearing-box 29 is. The bearing-box 40 is provided with a bushing 42 and a cap which is threadedly secured in the end of the box. The box 41 contains a bushing 43 and a gland 44 and a cap 45 and suitable packing 46 and is arranged similar to the box 30. The piston-shaft 39 extends axially through the center of the piston-chamber 6 and also through apertures 45$^A$ in the supplementary cylinder-heads. One end of the shaft 39 projects beyond the stuffing-box 41, and a fly-wheel pulley 45$^B$ is secured to it. These two shafts are positioned parallel with one another, and upon each in each cylinder I secure, preferably by keys 46, piston-disks 47 and 48. These piston-disks comprise a disk portion with an arm extension that extends from the periphery of the disk. The peripheries of the disk portions of the disks of each cylinder are provided with gear-teeth 49, and they are arranged and adapted to mesh and run together. Their diameters are consequently considerably less than that of the circular chamber in which each is placed, and the arm of each is arranged and adapted to extend to the inner periphery of its respective chamber. The piston-disks rotate in opposite directions, and in order that the arms may pass each other as the disks rotate I form in each disk under the arm a recess 50, which is adapted to allow the arms of the disks to pass freely by one another as they rotate. The arms of the piston-disks I term the "pistons." In Figs. 14, 15, and 16 I illustrate a recess 50$^A$, extending from the periphery of the disk into it. This recess is positioned just back of the piston-arm and is narrower than the thickness of the disk and is intended to act as a continuation of the effective steam-surface of the top of the piston's arm. I do not always employ this recess, but in most cases preferably do not use it in the piston-disks; but there are conditions in some sizes of engines where its use might be beneficial in increasing the steam area of the piston. The teeth on the periphery are accurately cut to mesh and run closely and practically noiselessly together. The piston-arms are shown in Fig. 5 receiving steam from the adjacent steam-port between them, and they rotate in opposite directions, and the upper surfaces or sides of the teeth of the lower piston and the lower surface of the teeth of the upper piston present effective piston area to the steam, which assists in rotating the pistons. While the two groups of upper and lower pistons may be arranged in any desired order, I preferably arrange them in each group in double spiral order. Thus, commencing at one end of the upper group, there being eight pistons, the first piston is set at the upward vertical quarter, the third at the right-hand horizontal quarter, the fifth at the downward vertical quarter, and the seventh at the left-hand horizontal quarter. This completes one spiral order. The second piston from the same end, the first started from in the same group, commences, preferably, at the downward vertical quarter and continues to alternate in order to the eighth piston, thus making two spiral orders of arrangement in the upper group. The lower group is arranged in the same double spiral order; but the first piston should preferably start on either the right-hand quarter or the left-hand quarter and the second opposite from it. There would then be four spiral orders of arrangement of the pistons, one starting from each quarter of the circle of the piston's revolution. At the top of the group of cylinders in the cut-off-valve port, which extends through all of the cylinders and supplementary cylinder-heads, I place a steam-distributing valve 51. This steam-valve comprises a tubular sleeve, which is fitted closely but revolubly in the valve-port. A cut-off valve 52 is revolubly mounted in the controlling-valve. This cut-off valve also comprises a tubular sleeve. The periphery of the cut-off valve is provided with eight ports 53, which are spaced at equal distances apart and positioned to register opposite each cylinder. The intermediate integral portions 54 are arranged to register opposite the supplementary cylinder-heads. These ports consist of slots cut through the periphery of the shell of the valve. The steam-distributing valve 51 is also provided with ports 51$^A$, spaced at equal distances apart and positioned to register opposite the ports in the cut-off valve, so that as the steam-valve rotates the ports when they register over one another will form a continuous passage from the interior of the cut-off to the exterior of the steam valve. They are, however, enough smaller in area to cover the ports in the cut-off valve and comprise apertures cut through the periphery of the shell. The ports 51$^A$ of the steam-distributing valve may be arranged in any desired order on the periphery thereof, as the ports for each cylinder and the action of each cylinder are independent of the others. In Figs. 4 and 9, however, I illustrate the ports arranged in spiral order and at the same time arranged opposite one another in pairs, commencing at either end of the tubular valve. The second port from the end is placed opposite the first port at the end. The next two ports are positioned opposite one another, and so on throughout the length of the valve. The ports, if preferred, can be arranged in a true spiral line from one end of the valve to the other and at equal distances apart, as shown in Patent No. 667,713, issued to me February 12, 1901. The order of arrangement of these ports may be varied as long as they are arranged to give each cylinder steam at each full revolution of the valve. The steam-distributing valve is interiorly threaded at one end, and a tubular valve-stem 56 is threadedly secured to the threaded end of the valve and is also secured by a pin $56^A$, which is driven into the valve and stem. (See Fig. 9.) This tubular valve-stem projects through a stuffing-box that is formed in the front cylinder-head. This stuffing-box comprises a hollow hub portion 58, which is formed on the cylinder-head, which is interiorly threaded. A round nut $58^A$, which is threaded at each end and is provided with a wrench-receiving portion 59, is threadedly secured to the interior of the hub. An axial bore 60 is formed in the nut in which the valve-stem is revolubly fitted, and a packing-chamber 61 is formed concentric with the bore of the hub. A gland 62 fits slidably in the counterbore of the nut and on the valve-stem and is provided with a projecting flange 63. A cap 64 is threadedly secured adjustably to the threaded end of the nut and is provided with an end flange that fits over the end of the gland and down over its projecting flange, and a suitable packing 65 is placed in the packing-chamber. The valve-stem extends beyond the stuffing-box, and its end is reduced in diameter, and a gear-wheel 66 is keyed or otherwise secured to it. This gear-wheel is of the same diameter and contains the same number of teeth as the gear-wheel on the piston-shaft. The cut-off valve 52 is also provided with a valve-stem 67, which is fitted revolubly in and extends through and beyond the tubular valve-stem of the steam-distributing valve. Its outer end is reduced in diameter, and a worm-wheel 68 is keyed or otherwise secured to it. The valve-stem extends beyond the worm-wheel, and a hood 69 is loosely mounted on it. This hood is provided with a flange portion that is arranged to stand substantially even with the end of the valve-stem, and an index 70 is marked on the face of the flange, which forms an indicating-dial and is used to indicate the various points of cut-off the valves are capable of. Thirteen index-lines are shown. The vertical one in the center represents the valve at two-thirds of its full cut-off position and six lines on each side of it the six points of steam cut-off in the operative travel of the piston-arms. The heavy index-lines $70^A$ on each side of the dial indicate the distance the cut-off valve must be moved in either direction in order to entirely cut off the steam on either side. An index-hand 71 is secured by a screw 72 to the end of the valve-stem and is shown pointed to the vertical line of the index-dial. In order to determine the exact position of the cut-off valve, I secure to the index-hand a cross-section model or form 73 of the cut-off valve. This cross-section is a thin disk and is an exact duplicate of a section taken at any part of Fig. 10 through any of the ports and is a substantial duplicate of the section shown in Fig. 11. I secure this model to the index-hand by a pin 74 and arrange it so that the opposite edges of its ports will stand at right angles to the index-hand, as shown in Fig. 1. The dial-hood is supported by two arms 77 and $78^A$, which are secured at one end to the cylinder-head and at the opposite ends are provided with collars and with reduced threaded ends to which nuts 78 and $78^A$ are threaded. (See Fig. 3.) The hood extends down below the worm-gear, and ears 79 and $79^A$ are formed on the lower end, which are mounted on the reduced ends of the arms 77 and $77^A$ and are secured there by the nuts 78 and $78^A$. The depending end of the hood is provided with a laterally-extending hub portion 80, which is arranged at right angles to the axis of the valve-stem. An axial bore is formed in this hub, and a shaft 81 is mounted revolubly in it. A worm-pinion 82 is secured to this shaft in the bottom portion of the hood to mesh into the worm-gear. This shaft 81 extends beyond the hood at both ends. At one end a collar 83 is secured by a pin or other suitable means, and at the opposite end a crank-handle $83^A$ is secured by which the pinion and gear-wheel and the cut-off valve may be turned and the steam cut off as desired, as will be explained more fully hereinafter.

An oil-passage 84 is formed in the front cylinder-head by a groove cut to intersect a counterbore 85. The oil-passage intersects the oil-hole through the top of the cylinders, and an oil-hole 86 is drilled through the steam-valve close to the end that extends into the counterbore 85 in the front cylinder-head. The oil-hole 86 intersects the oil-hole 84 and allows oil to flow to the stem of the cut-off valve. The counterbore also acts as an oil-passage to convey oil to the end of the valve that extends into the counterbore of the front cylinder-head. The steam-inlet to the valves is arranged in the rear cylinder-heads, into which the opposite ends of the valves preferably project. The cut-off and steam valves terminate even with each other and preferably project into a hole 87, formed in the rear cylinder-head in axial alinement with the axis of the valves. The hole 87 is formed in a projecting hub portion 88, formed on the outside of the rear cylinder-head, the outer portion of the interior of which is of larger diameter and is interiorly threaded. A plug-nut 89 is threaded to screw into said hole, and its inner end is positioned to form an abutment to the end thrust of the valves. A wrench-receiving portion 90 is formed on the nut-plug by which it is inserted or removed from the cylinder-head. A hole 91 is formed through the center of the plug-nut, and a pipe 92 is threadedly secured to the plug-nut. This pipe 92 is provided with an elbow 93, from which a pipe extends to a steam-supply.

94 and 95 designate combined steam inlet and exhaust valves. They are located at the lower end of the steam-ports 9 and 10 on opposite sides of the cylinder. These valves comprise cylindrical stems, (see Figs. 12 and 13,) with eight ports 96 cut substantially diametrically through the periphery of the stems at equal distances apart throughout the length of the valve, leaving semicircular integral disk portions 97 between the ports, the ports being in area practically one half of the circumference of the tubular valves and the blank valve portion the other half. The valves extend through the group of cylinders and supplementary cylinder-heads that comprise the engine. The ports 96 register opposite the steam-passages 9 and 10 of each cylinder, while the integral semicircular portions register opposite the supplementary cylinder-heads. These valves are each provided with an extension 98, which projects through suitable stuffing-boxes 100 and 101, which are similar in construction and arrangement to the stuffing-boxes of the piston-shafts which are fully described above. The valve-stem 98 projects beyond the stuffing-box 100, and a crank-arm 102 is preferably secured to it by a pin 103, which is driven through the arm and stem. A handle 104 is also formed integral with the crank-arm. The crank-arm is preferably positioned at a downward and outward angle from the center of the engine, while the handle is positioned in a vertical position. The extension 98 of the opposite valve also projects beyond the stuffing-box 101, and a crank-arm 105 is securely fastened, preferably, by a pin 106, which is driven through both. The valves are positioned in reverse or opposite positions in the steam-inlet ports, the valve 94 being shown in a closed position and the valve 95 in an open position. Consequently the steam-inlet port 10 is open and the steam-inlet port 9 is closed, and the pistons can only receive steam through the port 10 and the inlet-valve 95. The crank-arm 105 is positioned on the end of the valve to stand at the same angular position as the crank-arm 102, and this angular position is such that will permit them to have a horizontal swinging movement past the valve-stems that will reverse the position of the steam-inlet valves—that is, close the valve 10 and open the valve 9. In order to accomplish this reverse movement of both valves simultaneously, I pivotally connect the ends of the crank-arms by screw-bolts 106 and 107 to the opposite ends of an arm 108. The arm 108 is curved to extend over the projecting hub that supports the adjacent end of the lower piston-shaft. It is then only necessary to move the handle in the direction of the arrow 109 one-quarter of a revolution, or until it stands in a horizontal position, to reverse the valves and the direction of motion of the pistons and steam-valve, and consequently of the engine. The exhaust-passages 12 and 13 extend axially through all of the cylinders and supplementary cylinder-heads and through both cylinder-heads. The exhaust-passages are closed at the front cylinder-head and by the plugs 110 and 111, and at the rear cylinder-head end they are threadedly connected to nipples, to which elbows 112 and 113 are secured. From these elbows nipples extend to elbows 114 and 115, which are located near the top of the engine. These elbows connect by nipples with a T 116, from which a pipe may be led to carry the exhaust-steam away from the engine.

The operation of my improved rotary engine is as follows: Steam is admitted to the inside of the cut-off valve through the steam-pipe from a source of steam-supply. This cut-off valve is stationary; but its position is adjustably changeable by hand through the medium of the handle and the worm-gear and pinion which are connected to its valve-stem. It is set to stand with its valve portion on the bottom of the valve-port and with its ports vertically upward, in which position its ports are equally open to the steam-ports 9 and 10 on each side of it. Its indicating-model stands in the same position on the face of the dial, with the edges of its ports registering with the lower substantially horizontal lines 117 and 118 of the index of the dial, while the hand points vertically and registers on the center line 119 of the dial. The steam-distributing valve revolves on the cut-off valve continuously while the pistons are running, and it is geared to the shaft of the upper group of pistons to make a complete revolution in the same time and in unison with the pistons and their shafts. The steam passes from the interior of the cut-off valve through the ports of the revolving steam-distributing valve into the ports 9 or 10, depending on which is open. In Fig. 5 the port 10 is open and the port 9 is closed by the steam-inlet valve 94. Consequently the steam enters the port 10 through the port of the steam-distributing valve from the cut-off valve and flows through the valve 95 into the piston-chambers and forces the upper piston-arm up and around in the direction of the arrow 120 and the lower piston-arm down in the direction of the arrow 121. When the pistons arrive at the diametrical opposite side of the piston-chambers, the steam exhausts through the combined steam inlet and exhaust valve 94 into the exhaust-port 14 and exhaust-passage 12 and escapes to the atmosphere. The upper and lower pistons thus coöperate to develop power, which is taken from them by a fly-wheel and belt or other suitable means. In order to use the steam expansively, it is only necessary to turn the cut-off valve by means of the handle and worm-gears and index-hand and the model-valve to the point of cut-off desired on the dial. Thus the dial, as illustrated, is graduated to six parts of the full-steam operative movement of the pistons. Consequently if it is desired to cut off at one-sixth of the operative stroke or movement of the pistons it is only necessary to move the hand-index to the dial-line 122. The model will then move to dial-line 123, indicating that the cut-off valve has been turned to close the space between the edge 124 of its valve and the edge 125 of the steam-port 10, and thus permitting the steam-distributing valve as it rotates to close its port-opening one-sixth quicker as it passes these two points when admitting steam to port 10. If it is desired to cut off at one-third of the stroke, the hand-index is moved to the second dial-line from the vertical and one-half to the third dial-line, and if two-thirds, to the fourth dial-line, and if five-sixths, to the fifth. The cut-off valve is moved away from the port 10 when the steam is entering that port and away from port 9 when the steam is entering port 9, in which case the steam-valve and the pistons would be rotating in reverse direction from that shown in Fig. 5. It will thus be seen that I am able to use steam in my rotary engine in the most practical manner expansively to the fullest limit employed in the most modern highest-grade steam-engines of any type the state of the art has developed to the present time and that my engine will develop much greater power, more economical in the use of fuel and of steam, with far less expense as to cost of material and workmanship and foundation-space than any steam-engine yet produced.

I have described my engine in connection with steam, which will be the most generally-used expansive fluid. Compressed air can, however, be used where conditions make its use more economical.

I am not only able to use steam expansively to any part of the operative movement of the pistons, but also by means of the cut-off valve I am enabled to develop several different horse-powers. Thus if the engine illustrated should be attached to an automobile, on level roads but little power would be required, and the cut-off valve could be set to cut off at one-sixth of the stroke. If the automobile was climbing a slight hill, the cut-off valve could be moved to cut off at two-sixths or one-third of the stroke. If a steep hill was to be ascended, the cut-off valve would be moved to cut off at two-thirds of the stroke. In each case more power would be required and more would be supplied by the engine. This feature, which is one of great value, is especially well adapted to hoisting-engines for mining purposes. If one of my engines is employed in hoisting rock or dirt in sinking shaft, say, a thousand feet deep for the first two hundred feet the steam can be cut off at one-sixth of the operative stroke of the pistons. The next two hundred feet the steam can be cut off at two-sixths or one-third of the stroke, the next two hundred at three-sixths or one-half of the stroke, and so on until the last two hundred, where steam would be used under direct pressure and not expansively.

While I have illustrated and described the preferred construction of my improved rotary engine, I do not wish to be limited to the exact construction and arrangement shown, as many changes might be made without departing from the spirit of my invention.

Having described my invention, what I claim as new, and desire to secure by Letters Patent, is—

1. In a rotary engine, an operative group of cylinders, each being provided with two intersecting piston-chambers and having a steam-inlet port and two steam-ports extending from said steam-inlet port to and entering opposite sides of each cylinder in said group of cylinders, and an exhaust-port leading from each cylinder to the atmosphere, an operative valve in said steam-inlet port arranged to admit steam operatively to all of said cylinders, valves arranged at opposite sides of each cylinder and extending through all of said cylinders and adapted and arranged to control and govern the direction of rotary movement of said engine, rotary pistons operatively mounted in each cylinder and arranged to rotate with their peripheries in rolling and intermeshing contact and arranged to receive steam from said valved steam-ports between them, suitable front and rear cylinder-heads for said group of cylinders, divisional or supplementary cylinder-heads arranged between each cylinder and adapted to separate said cylinders and their pistons one from another and means for detachably securing said cylinder and supplementary cylinder-heads and said front and rear cylinder-heads into an operative engine, substantially as described.

2. In a rotary engine, a plurality of cylinders, each comprising circular intersecting rotary piston-chambers, a pair of coöperating rotary pistons in the said piston-chambers of each cylinder, ports arranged to admit steam at opposite sides of said piston-chambers, a cut-off-valve mechanism arranged to control said steam-ports and arranged and adapted to adjustably cut off the steam at predetermined portions of said piston's operative movement, combined steam inlet and exhaust valves arranged to control the ingress and egress of the steam from said steam-ports into and from said piston-chambers, and suitable exhaust-ports extending from said combined steam inlet and exhaust valves to the atmosphere, substantially as described.

3. In a rotary engine a plurality of cylinders, each being divided from one another by removable supplementary cylinder-heads, suitable cylinder-heads at each end of said plurality of cylinders, an intersecting pair of rotary piston-chambers in each cylinder, a piston-shaft operatively mounted axially through each piston-chamber of the plurality of cylinders, a pair of coöperating rotary pistons in each cylinder arranged with their peripheries in rolling contact with each other, a steam-inlet port arranged axially in said cylinders; steam-ports arranged to extend from said steam-inlet port to the opposite sides of each of said plurality of cylinders, exhaust-ports operatively arranged to intersect each of said steam-inlet ports and extending to the atmosphere, an adjustable steam-cut-off valve arranged in said steam-inlet, a combined steam inlet and exhaust valve arranged to control the steam and exhaust ports leading to and from said cylinders, and a power connection between the piston-shafts and said adjustable cut-off valve arranged and adapted to operate said valve in unison with the rotative movement of said pistons, substantially as described.

4. In a rotary engine the combination of a group of cylinders, each having two intersecting rotary piston-chambers so arranged as to form a continuous monolithic piston-chamber with a cylindrical piston-chamber at each end, a pair of piston-disks operatively mounted in each chamber, each having a toothed periphery arranged and adapted to mesh operatively and to roll together, a piston-arm extending from each of said toothed disks to the inner periphery of the surrounding chamber of each disk and a recess in each piston-disk arranged and adapted to permit each piston's arm to pass through its coöperating piston-disk as it rotates in its respective chamber and passes through an arc of the adjacent piston's chamber, and a steam impact-recess adjacent to the upper side or steam impact portion of said piston-arms extending into the periphery of said disks between their sides, substantially as described.

5. In a rotary engine, the combination with the cylinders, the pistons and the cylinder-heads of a condensed-steam passage arranged below said cylinders and extending in axial alinement with said cylinders and pistons through the shell of said cylinders and cylinder-heads to the atmosphere, a valve in said passage comprising a rod provided with a port comprising an axial groove, means including a lever for rotating said valve to operatively open and close said valve, an aperture extending from the bottom of each cylinder into said condensed-steam passage, and a pipe secured to the entrance of said condensed-steam passage leading away from said cylinders, substantially as described.

6. In a rotary engine, the combination of the supporting-base, the cylinders, the rotary pistons and their piston-shafts, the rear and main cylinder-heads provided with suitable stuffing-boxes for said piston-shafts, the supplementary cylinder-heads, the steam-inlet, steam-distributing, and steam-exhaust ports, with a combined cut-off and steam-distributing valve operatively arranged in said steam-inlet port, means including gearing for actuating said steam - distributing valve operatively from and in unison with the rotary movement of said pistons, means including gearing and indicating mechanism attached to said cut-off valve for adjusting and for indicating the amount of adjustment of said cut-off valve relative to said steam-ports whereby steam may be used expansively, combined steam inlet and exhaust valves arranged in said steam and exhaust ports at opposite sides of said cylinders, one of which is arranged to be open when the other is closed, and means including a lever for connecting said valves together in their operative reverse position and means including a manually-operated handle for reversing the operative position of said valves whereby said steam and exhaust ports are controlled and its direction of rotary movement may be reversed at the will of the operator, substantially as described.

7. In a rotary engine, the combination of the cylinders, the pistons and the cylinder-heads, with the condensed-steam passage extending axially through said cylinders, the valve rotatably mounted in said passage, the ports extending from each cylinder into said passage and opening into the atmosphere means including a pin for confining said valve rotatably in operative position and a lever in the end of said valve to operate the same, substantially as described.

In testimony whereof I affix my signature in presence of two witnesses.

JOHN KNOWLES.

Witnesses:
G. SARGENT ELLIOTT,
JOSEPH WILKINSON.